US008060546B2

(12) United States Patent  (10) Patent No.: US 8,060,546 B2
Law et al.  (45) Date of Patent: Nov. 15, 2011

(54) POSITIONALLY DEPENDENT PATTERN CHECKING IN CHARACTER STRINGS USING DETERMINISTIC FINITE AUTOMATA

(75) Inventors: David Law, East Lothian (GB); Peter Furlong, Dublin (IE); Eugene O'Neill, Dublin (IE); Kevin Loughran, Castleblayney (IE)

(73) Assignee: Hewlett-Packard Company, Palo Alto, CA (US)

( * ) Notice: Subject to any disclaimer, the term of this patent is extended or adjusted under 35 U.S.C. 154(b) by 1110 days.

(21) Appl. No.: 11/848,302

(22) Filed: Aug. 31, 2007

(65) Prior Publication Data

US 2008/0059464 A1  Mar. 6, 2008

(30) Foreign Application Priority Data

Sep. 1, 2006  (GB) .................................. 0617232.4

(51) Int. Cl.
*G06F 7/00* (2006.01)
(52) U.S. Cl. ...................................... 708/211
(58) Field of Classification Search .................. 708/212
See application file for complete search history.

(56) References Cited

U.S. PATENT DOCUMENTS

| | | | | |
|---|---|---|---|---|
| 5,073,864 | A | * | 12/1991 | Methvin et al. ............... 708/212 |
| 5,140,644 | A | * | 8/1992 | Kawaguchi et al. .......... 382/226 |
| 5,452,451 | A | * | 9/1995 | Akizawa et al. ....... 707/999.006 |
| 2004/0162826 | A1 | | 8/2004 | Wyschogrod et al. |

FOREIGN PATENT DOCUMENTS

| GB | 2422450 A | 7/2006 |
|---|---|---|
| GB | 2422507 A | 7/2006 |

OTHER PUBLICATIONS

Search Report from counterpart Great Britain Application No. GB0617232.4, Oct. 2006.
A-Ning Du et al, "Comparison of Stringmatching Algorithms: An Aid to Information Content and Security," Proceedings of the Second International Conference on Machine Learning and Cybernetics, Nov. 2003, vol. 5, Harbin Institute of Technology, Harbin, China.

* cited by examiner

*Primary Examiner* — Tan V Mai

(57) ABSTRACT

A deterministic finite state machine organised for the detection of positionally significant matches of characters in a string of characters examines each character in turn to determine a exit transition for a current state of the machine to another state The machine responds to an examination of the string of characters by executing in response to a first character at the commencement of the string a transition from an initial state to another state. The machine has at least one state for every character position, includes a exit transition from each state for each character to another state; and possesses only forward exit transitions each from any of the states whereby the current state of the machine unambiguously represents a count of the number of characters from the commencement of the string. The machine may include at least one match state which indicates that all character matches in the string required by at least one respective rule have been detected. Some but not all the states in the multiplicity of states each have a single exit transition for any value of a respective character in the string. At least some of the states in the multiplicity of states each define an exit transition to a state indicating 'no match'. The machine may be disposed to cease its examination of the character string on attaining a 'no match' state.

11 Claims, 20 Drawing Sheets

| REGULAR EXPRESSION | NFA |
|---|---|
| EMPTY STRING |  |
| CHARACTER a |  |
| UNION a/b |  |
| CONCATENATION ab |  |
| ZERO OR MORE a* |  |

REGULAR
EXPRESSION           NFA ad ad

POSITIONALLY DEPENDENT PATTERN CHECKING IN CHARACTER STRINGS USING DETERMINISTIC FINITE AUTOMATA

This application claims foreign priority benefits, under 35 U.S.C. 119, of United Kingdom patent application serial number 0617232.4, filed on Sep. 1, 2006, and titled "Positionally dependent pattern checking in character strings using deterministic finite automata."

FIELD OF THE INVENTION

This invention primarily relates to the detection of positionally significant digital patterns or signatures in a character string and more particularly to the detection of pattern matches in the header of an addressed data packet, that is to say a packet which includes a header, that customarily includes data fields identifying a source and a destination (or group of destinations) for the packet, data identifying the transmission protocol under which the packet is transmitted and a payload. The invention also applies to headers of packets which are themselves included as payloads within other packets, as in virtual private networks and tunnelling and also applies to packets which may be encrypted.

BACKGROUND OF THE INVENTION

Network security systems, often described as intrusion prevention systems (IPS) or intrusion detection systems (IDS) commonly employ both pattern matching, performed on a data stream represented by the packet payload, and the checking of headers to detect unwanted or undesirable digital signatures which may represent a security threat. Within the security rules used by such systems there are normally links between specific header values and the security thread content in the payload. For example, a particular signature that may be significant (for example, because it represents a potential threat) in one type of packet (e.g. a UDP packet) may not be important in another type (e.g. a TCP packet). When a pattern is detected but, having regard to its context, is not significant, it is generally termed a 'false positive'. The production and elimination of false positives represent severe processing overhead in detection systems.

It is accordingly not only necessary to detect the signature but also to 'post-process' the header to check for the header value qualifiers which confirm the 'authenticity' of a potential violation of security. In many cases there are several header fields which must match a specific value in order to determine that a genuine positive match has been obtained.

A DFA, otherwise called deterministic finite automata, or deterministic finite state machine, as represented in graphical form, has a plurality of states each of which has an exit or transition dependent on an examination of the next 'character' or 'byte' in a string of characters that the DFA examines. In one practical example, each state of the DFA is represented by a group of locations in a memory. The action of examining an incoming character to determine what action, and in particular what transition if any is required is preferable in practice performed by adding a offset, particular to the state, to the current character to access one of the respective group of memory locations. The locations may contain at least one pointer which determine the next transition of the machine. In its simplest practical form, termed a single table machine, a DFA comprises, for each state, a multiplicity of locations showing the next state for each of the possible variations of an input character. Where, as is typical, an input character is a byte, a single table machine requires 256 locations, only one of which will identify a state other that the initial or default state. Thus the memory space required for a single table machine is in practice unmanageably large. A great reduction in the required memory space can be achieved by means of a dual table machine, wherein one table contains 'default state' and 'offset' information and the other contains 'next state' and 'check state' information, as will be described in more detail later.

The requirement for detection of significant patterns in payloads of data packets differs substantially from those relating to patterns in a header. A significant pattern may occur anywhere and may represent the same potential threat wherever it may occur in a payload and may extend across packet boundaries, for example being represented by a pattern which begins in the payload of one packet and ends in the payload of a subsequent packet. A DFA is well adapted for searching for such patterns.

As indicated above, the any given pattern (whether representing a threat or not) in the header of a packet varies in significance because headers are necessarily organised such that different fields have a meaning dependent not only on their content but also on their location, i.e. their offset from the start of the packet. For example, the header of a packet conforming to IPv6 (Internet Protocol, version six) has 40 bytes which comprise, in order, a byte identifying the version (in this case the binary equivalent of 6), a byte identifying a traffic class, two byte constituting a flow label, two bytes specifying the length of the payload, a 'next header' byte identifying the protocol (e.g. TCP or UDP), to which the contents (payload) of the packet will be delivered, a byte specifying the hop limit, a 16-byte source address and a 16-byte destination address. It follows that a given pattern of characters (i.e. bytes) requires a knowledge of the offset from the start of the packet for the determination of its significance.

Current methods for the detection of digital signatures in addressed packets separate the analyses of the payload and the header of a packet. Such a separation is inefficient and significantly increases the number of false positives detected by the system. Post processing also increases latency through the detection system. The main reason for the separation of the tasks of analysis of the payload and analysis of the header is due to the characteristics of a standard DFA graph. This does not support location-based searching. A standard DFA searches for all patterns in the DFA graph in a continuous stream but cannot stop searching for a pattern after, for example, a specific number of bytes. An ordinary graph necessarily includes return transitions from many states at least to a default state.

GENERAL SUMMARY

The present invention is based on the modification of the DFA graph so that a DFA can be used to check for location based values. The invention can be used to check for specific values of fields in the header of a packet and to facilitate the linking of the header values with any content pattern matches which are subsequently discovered.

In essence, a preferred DFA according to the invention differs from a normal 'content' DFA in two and preferably three ways. First, the DFA graph will contain only forward paths; it will not have a transition form any state to a state that could previously have been entered. Second, there will be transition from each state to another state for each possible header character. In some cases this transition will be a 'don't care' transition if that particular byte of the header is not of interest to any of the rules relating to the header. Thirdly, if a state is reached in the graph where there is not a don't care transition out, and an incoming byte does not meet any of the conditions for transitions from the state, the transit of the graph can be halted, because there has now been a determination that the incoming header does not match any of the patterns of interest.

A further advantage of a header DFA according to the invention is in combination with a content DFA to constitute a 'Rules DFA'. The results from a header DFA and a Content DFA can be passed through a rules DFA to see if any threat has actually been found. A Rules DFA would be similar to a Header DFA in that it only has forward paths and can have states which when reached indicate that no threat can exist and that the graph can be exited. It however does not have the position dependence in respect to counting characters and therefore does not have don't care transitions. Hence in summary Content DFAs, Header DFAs and Rule DFAs all have slightly different behaviour although they can all be built from the same DFA state machine, it is just the graph that is programmed differently in each case.

Further features of the invention will become apparent from the following description with reference to the drawings.

DETAILED DESCRIPTION

Both Deterministic Finite Automata (DFA) and Nondeterministic Finite Automata (NFA) are discussed below because the generation of a NFA is part of the process of converting sets of Regular Expressions (RE) to Deterministic Finite Automata.

Figure 1:
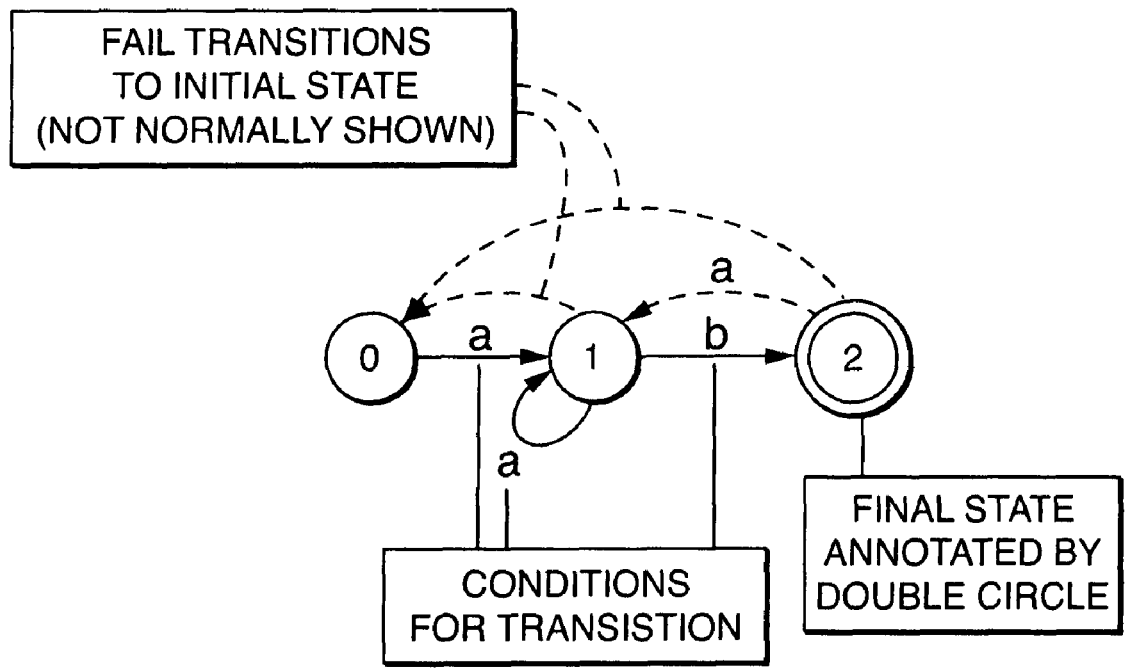
FIGS. 1-8 are explanatory diagrams showing the development of DFA graphs.

In general a Finite Automata (NFA or DFA) is a state machine consisting of a set of states with transitions between the states controlled by the incoming character. One state is designated the initial state and one or more states are designated match states. The state machine starts in the initial state and each character of an input string of characters, e.g. a data packet, is processed by transitions through the state diagram. A Finite Automata (FA) either accepts or rejects an input string, the string is accepted if the FA reaches a match state, and rejects the string it if the FA does not reach a match state.
State Transition Diagrams Typically, DFAs and NFAs are represented by state transition diagrams. A simple example of a DFA is shown in FIG. 1. Each state is represented by a circle; a match state is represented by a double circle. The transition from a state to another state is labelled with the character required to make that transition. The fail transitions, back to the initial state, one of which is taken when none of the labelled transitions can be made, are not normally shown on state transition diagrams although for the sake of completeness they are shown as the dotted lines in FIG. 1.

A DFA is the simplest form of FA with no more than one transition from a state dependent on a single character. This means that a DFA can only ever be in one state at a time and therefore lends itself to implementation in a Finite State Machine (FSA).
Non-Deterministic Finite Automata (NFA)

An NFA is similar to a DFA with the exception that in a NFA, a single character input can lead to zero, one or more transitions from that a state. The important difference is that there can be more than one transition from a state on input of a character, this means that a NFA can be 'in' multiple states at any point of time—that is what makes it 'non-deterministic'. An NFA also supports 'ϵ' (epsilon) transitions, namely transitions on an empty string. These transitions allow an NFA to transition from one state to another instantaneously without consuming an input character. They are used as a programming convenience, for example when converting FEs to NFAs, but can be eliminated from a NFA through optimisation.

NFAs are more difficult to implement in hardware, or software, than a DFA owing to their ability to be in multiple states at any one time. This also presents a difficulty for stream based processing where the stream is contained in several packets, because saving the context of the NFA between packets will consume more storage space than for a DFA, which only requires the storage of a single state.

Figure 2:
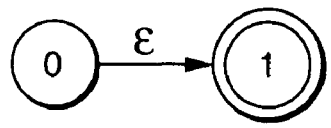
Figure 2:
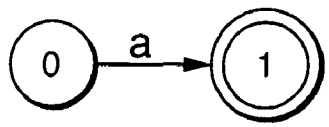
Figure 2:
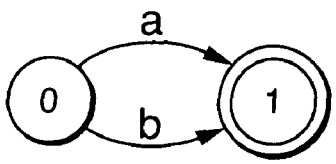
Figure 2:
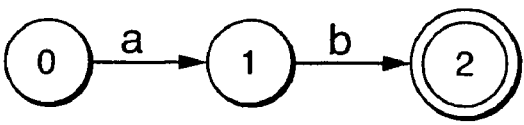
Figure 2:
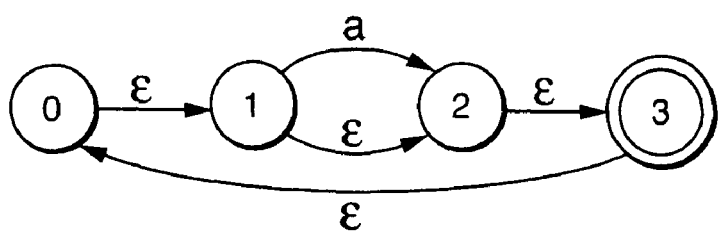

In summary therefore a DFA can only be in one active state at any point in time. This provides for simpler state machine encoding, and ease of context preservation, but is liable to result in a larger number of states. Alternatively a NFA can be in multiple states at any time. A NFA on the other hand should be of smaller size but the requirement for the machine to be in multiple states at any one time results in more complex state machine encoding and greater storage required for context preservation.
Converting Regular Expressions to a DFA One method of converting a set of Regular Expressions to a DFA is in three steps. The first step is to convert the Regular Expressions into to an NFA. The second step is to convert the NFA to a DFA. The third step is to minimise the DFA. Once the minimised DFA is obtained it can then be implemented in a Finite State Machine (FSM).
Converting Regular Expressions to a NFA A preferred method of converting Regular Expressions to a NFA consists of using a set of five rules, called Thompson's algorithm or construction. These rules are illustrated below in FIG. 2. The five rules are those for an empty string, a character, the union of two (or more) characters, a concatenation of characters and a string consisting of any number, including zero, of occurrences of a character.

Figure 3:
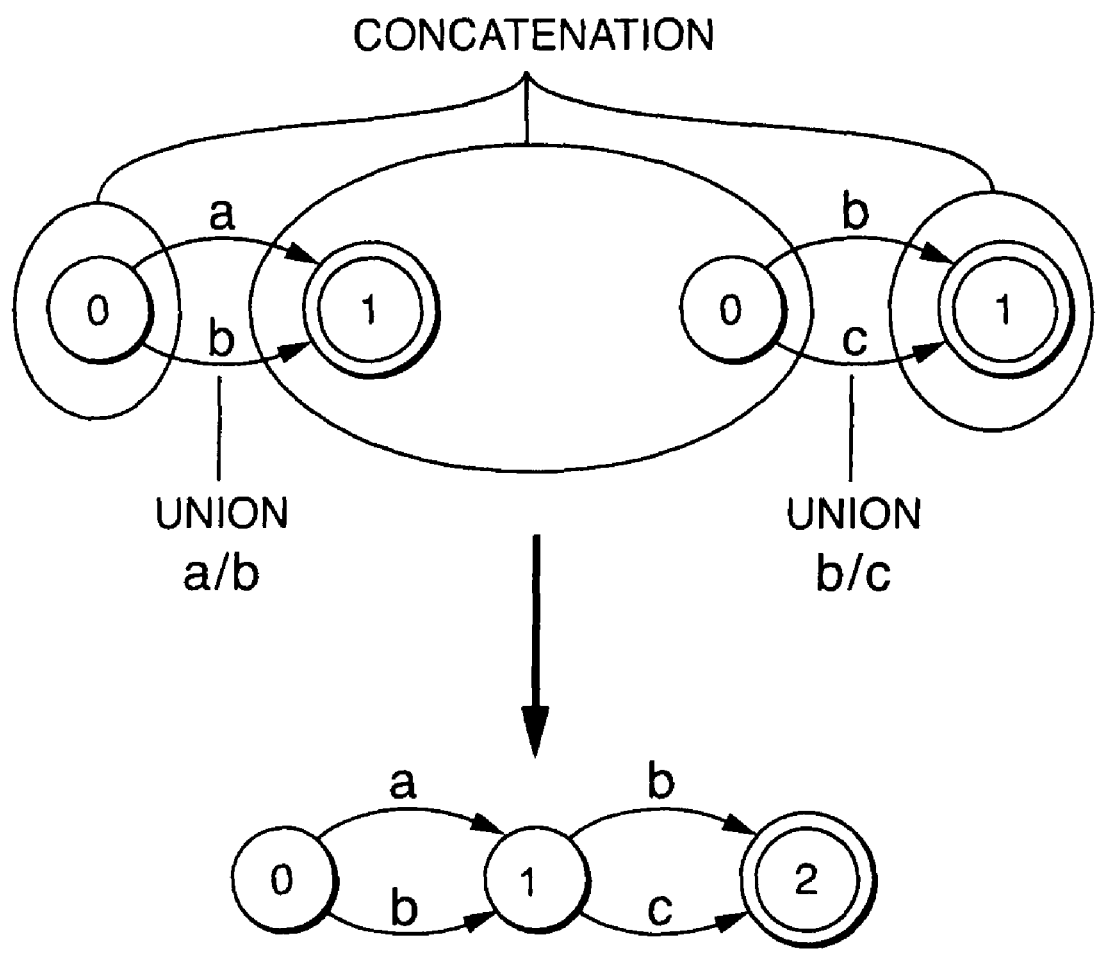
Figure 4:
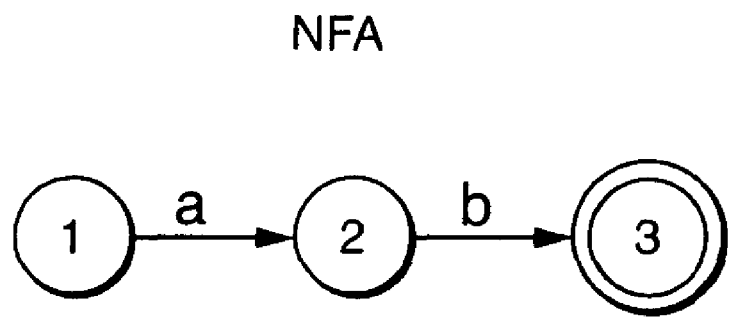
Figure 4:
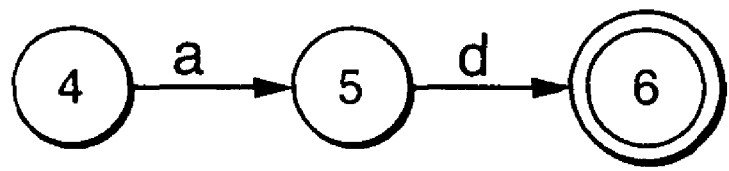
Figure 5:
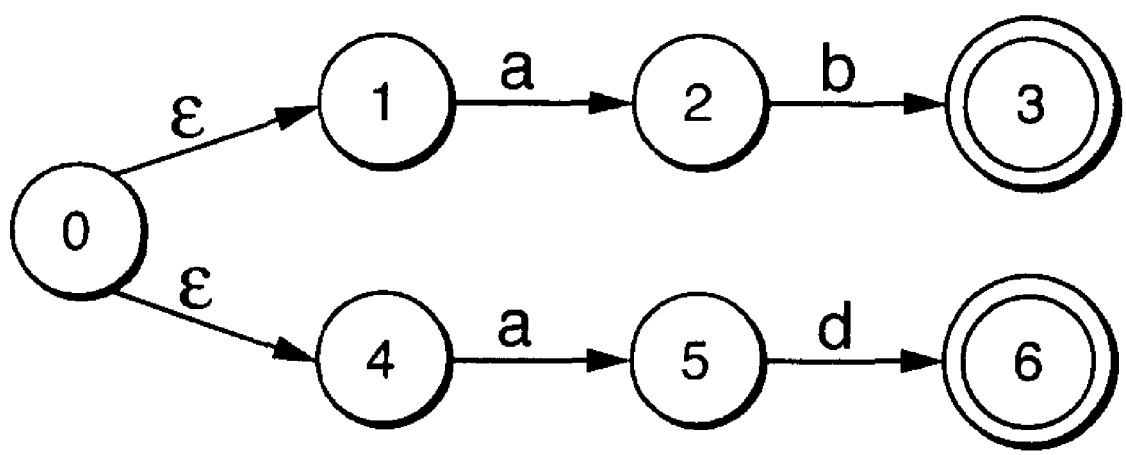

Combinations of these rules may be required to convert a single Regular Expression. For example (a|b)(b|c) requires the use of the concatenation rule and two uses of the union rule to combine them. This is illustrated in FIG. 3; After each Regular Expression is converted into a NFA there will be as many NFAs as there Regular Expressions. At that point all the NFAs are combined into one single large NFA by the addition of a single new node with a transition from that node to the initial node of all the original NFAs and that transition has the condition epsilon. FIGS. 4 and 5 illustrate this conversion for the two regular expressions ab and ad, shown separately in FIG. 4 and shown combined in FIG. 5.
Converting a NFA to a DFA The usual algorithm employed to produce a DFA from a NFA is called subset construction. This proceeds as follows. Starting at state zero, one lists the transitions to all states that can occur in the NFA for all possible inputs. For each combination of reachable states, the combination is named as a state for the DFA. For this new state the process of determining all possible transitions to all combination of states is repeated, any new combination of NFA states being labelled as a new DFA state. This process is repeated until no new reachable combination of states can be found in the NFA. Any set of reachable states that include a terminating state from the NFA will be considered a terminating state for the DFA.

Example of Conversion of an NFA to a DFA

The NFA shown in FIG. 5 may be converted to a DFA by means of the following listing in Table 1 below.

TABLE 1

| Current State | Transition | | New State | DFA label |
|---|---|---|---|---|
| 0 | No input | → States 1 and 4 | (1, 4) | A |
| (1, 4) | Input a | → States 2 and 5 | (1, 4, 2, 5) | B |
| (1, 4) | Other | → States 1 & 4 | (1, 4) | A |
| (1, 4, 2, 5) | Input a | No change | (1, 4, 2, 5) | B |
| (1, 2, 4, 5) | Input b | → Exit state 2 & 5, enter 3 | (1, 4, 3) | C |
| (1, 2, 4, 5) | Input d | → Exit states 2 & 5, enter 6 | (1, 4, 6) | D |
| (1, 4) | Other | → to 1 & 4 | (1, 4) | A |
| (1, 4, 3) | Input a | → Exit state 3, enter 2 & 5 | (1, 4, 2, 5) | B |
| (1, 4, 3) | Other | → States 1 & 4 | (1, 4) | A |
| (1, 4, 6) | Input a | → Exit 6, enter 2 & 5 | (1, 4, 2, 5) | B |
| (1, 4, 6) | Other | → States 1 & 4 | (1, 4) | A |

Figure 6:
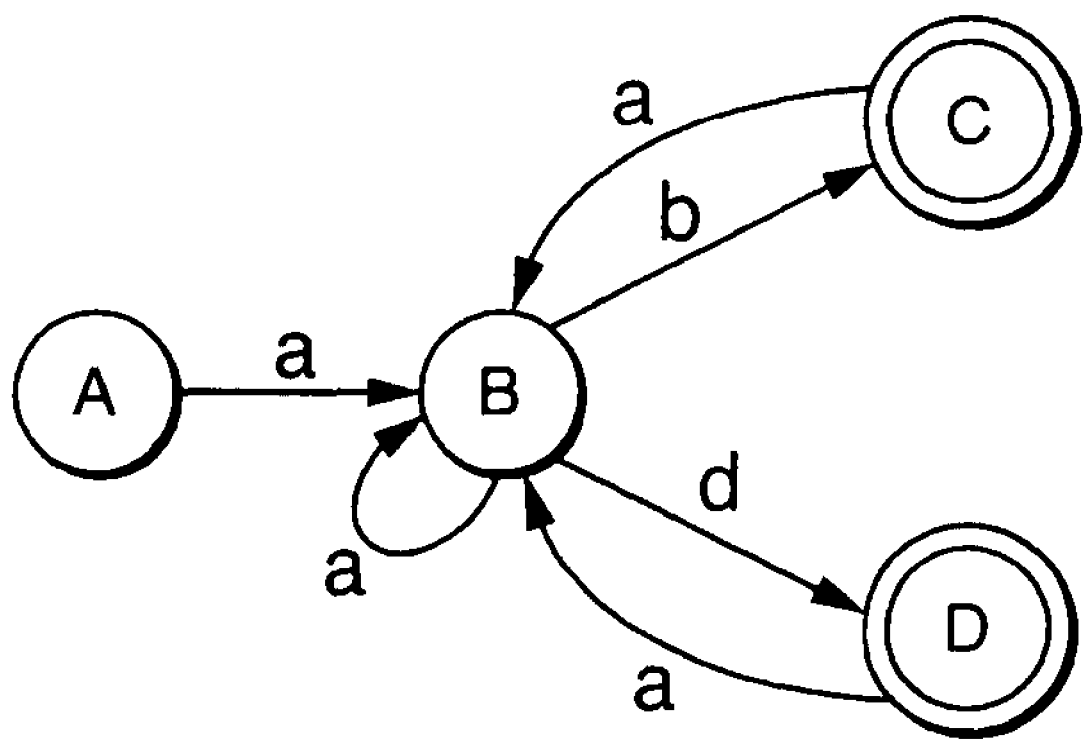

The resultant DFA graph is shown in FIG. 6.

Size Reduction in a DFA

As will be known to those skilled in the art, a DFA has to examine each 'character' in an input string and determine what transition is required. In practice, as will be apparent hereinafter, it is convenient to implement a DFA by means of high-speed random-access memory. Then the examination process and the determination of action can readily be performed by a simple arithmetic operation on an input character so as to index a respective one of a group of storage locations which contain pointers identifying the next state. Although it is theoretically possible to choose the character size as one bit, such a choice would require an impossibly large number of states in the DFA and it is usual to choose the character size as one byte. Even this can require a large memory space, since simple implementation (called herein 'single table') would require 256 storage locations for each state in the DFA.

Another factor in the size of the DFA is the nature of the corresponding NFA. Since when traversing an NFA it is possible to be in many states at any point of time, and the conversion algorithm from a NFA to a DFA involves creating a state in the DFA for every possible combination of states the NFA can be in, this can lead to an explosion in the number of states in the resultant DFA. The worst case would be 2 to the power of the number of NFA states although this worst case is most unlikely.

There are two approaches to reducing the size of a DFA, namely minimisation of the DFA, which reduces the number of states in the DFA, and compression, which reduces the storage required for the DFA.

DFA Minimising

One algorithm used to minimise a DFA is to identify equivalence. Equivalence for two states may be defined as when any string that will lead to an accepting state from the first state will also lead to an accepting state from the second state and that any string that does not lead to an accepting state for the first state will also not lead to an accepting state from the second state. When two states can be identified as equivalent through this process they can be combined. In summary two states can be combined if all subsequent behaviour is the same.

Compression of a DFA

This approach, rather than reducing the number of states in the DFA instead, reduces the storage space it takes to store each DFA state. A DFA state is in principle a look up table with that number of entries which corresponds to the number of possible values of an input character. The number is, of course, 256 if the size of an input character is one byte. In many cases for example only one character value will cause a transition to another state and all other possible values of a character will terminate the search so the use of 256 storage locations for each state in the DFA is theoretically and in practice very inefficient. A popular way of reducing the memory space is to employ a dual table DFA, as will be described later. However, in some circumstances a 'pure' dual table implementation is not convenient and the invention is not therefore limited to dual table implementation of a DFA.

Anchored and Unanchored Searches

Figure 7:
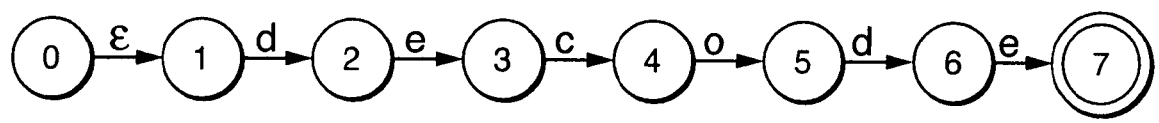

Take the example of a pattern match for the character string 'd-e-c-o-d-e'. As described above there is a three step process to convert this regular expression into a DFA. First, the regular expression is converted into a NFA as described in above. The resultant NFA is illustrated in FIG. 7. This has an initial state 0, an epsilon transition to state 1 and successive transitions, dependent on the arrival of the characters in turn, to a final state 7. The next step is to convert this NFA into a DFA using subset construction as described above, and as illustrated in Table 2.

TABLE 2

| States | Input | Transition | Next State |
|---|---|---|---|
| State 0 | none | → state 1 | (1) |
| State A | | | |
| State 1 | d | → states 1 & 2 | (1, 2) |
| State B | | | |
| State A | other | → state 1 | (1) |
| State (1, 2) | e | → states 1 & 3 | (1, 3) |
| State C | | | |
| State B | d | → states 1 & 2 | (1, 2) |
| State A | other | → state 1 | (1) |
| State (1, 3) | c | → states 1 & 4 | (1, 4) |
| State D | | | |
| State B | d | → states 1 & 2 | (1, 2) |
| State A | other | → state 1 | (1) |
| State (1, 4) | o | → states 1 & 5 | (1, 5) |
| State E | | | |
| State B | d | → states 1 & 2 | (1, 2) |
| State A | other | → state 1 | (1) |
| State (1, 5) | d | → states 1, 2 & 6 | (1, 2, 6) |
| State F | | | |
| State A | other | → state 1 | (1) |
| State (1, 2, 6) | e | → states 1, 2 & 7 | (1, 2, 7) |
| State G | | | |
| State B | d | → states 1 & 2 | (1, 2) |
| State A | other | → state 1 | (1) |
| State (1, 2, 7) | c | → states 1 & 4 | (1, 4) |
| State D | | | |
| State B | d | → states 1 & 2 | (1, 2) |
| State A | other | → state 1 | (1) |

Figure 8:
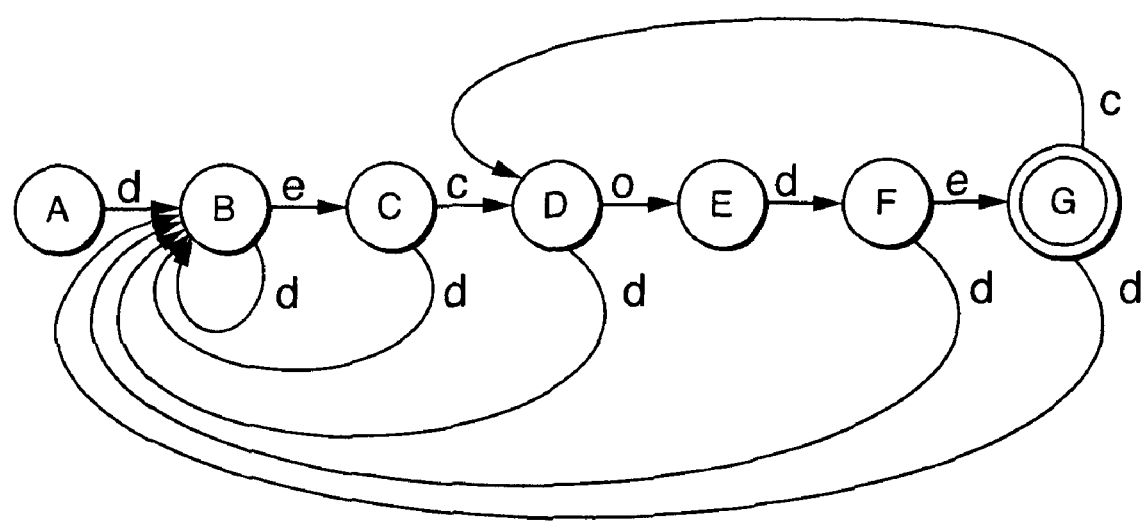

The final step is to draw out the DFA graph produced by this subset construction. This graph is shown in FIG. 8. As can be seen the resultant DFA does indeed perform an unanchored search. If the DFA reaches State G, that is the string 'decode' has been detected and the string 'code' follows the Final State G will be reached again. This means that the string 'd-e-c-o-d-e-c-o-d-e' will result in the Final State G being reached twice. The steps this DFA will follow for the string 'decode-code' are from States A→B→C→D→E→F→G→D→E→F→G. An anchored search would only reach the Final State G once for the string 'decodecode'. This could be achieved in the above graph by removing the reverse transition from State G back to state D on reception of the character 'c' which instead would simply force a default transition.

Header Matching Using a DFA

Header matching by using a DFA state machine may now been approached in a manner different to the known practice that has been described above. In one header matching configuration the manner of construction of DFA state machine is identical to that described above; it is just the DFA graph that is organised differently, by different hardware programming of the memory.

In the case of header matching the pattern required for a match to occur, for example a particular destination IP address, has to also be in a certain position; in the case of an destination IP address for example the relevant pattern must occur in the characters in the position destination IP address field. This is different from the normal payload pattern matching where, regardless of the location of a target pattern, if the pattern occurs, a match is obtained. More importantly this means in the case of header matching, if a particular part of a pattern does not occur at its nominated position that pattern match has at that point failed—there is no need to restart the search and also no useful purpose in continuing to run the DFA. The DFA at this point can be considered to have reached a 'No match' state. There is also no point in running either a content DFA on the packet or a rules DFA: the packet is not a threat.

There is also a difference in that when a match does occur during header matching since once the pattern is found it cannot be found again owing to the positional dependency. At this point the DFA can be considered to have reached a match as well as a final state hence the respective state may be termed is termed 'Match and final'.

These two additional special states of 'No match' and 'Match and final' for header matching are very convenient although not absolutely necessary; after the DFA reaches these states it could be allowed to continue to run but all it would be doing is looping regardless of the input character.

Figure 9A:
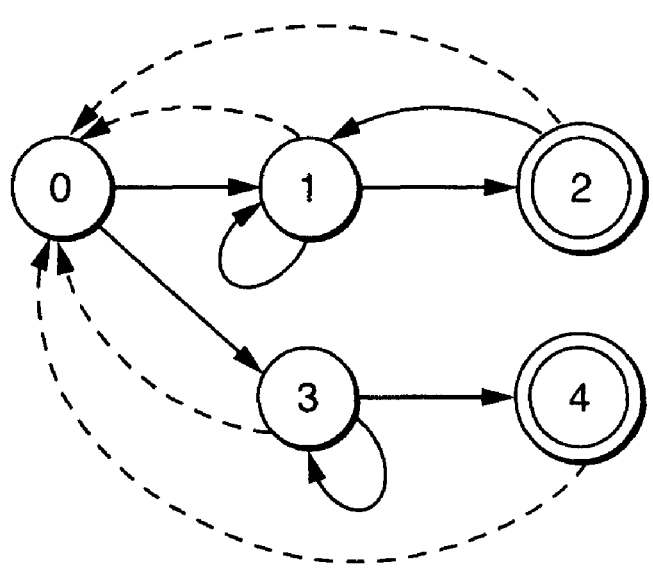
FIG. 9 is a diagram indicating differences between a header DFA graph and an ordinary DFA graph.
Figure 9B:
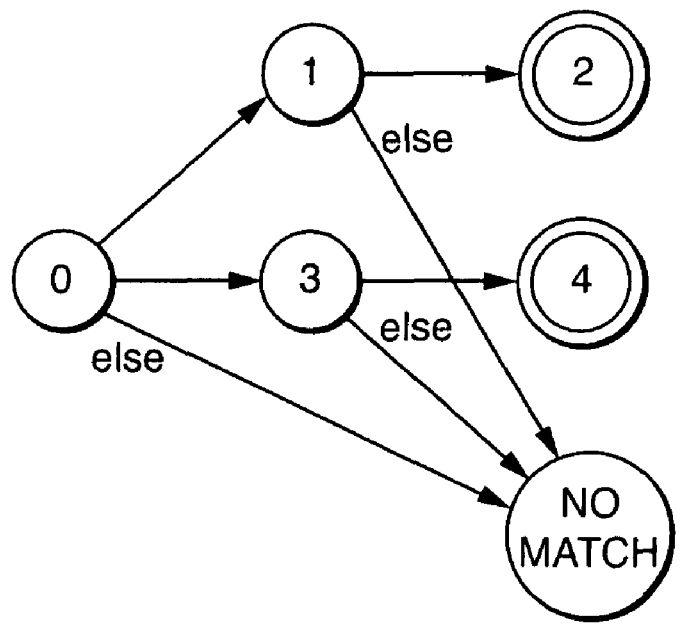

FIG. 9 illustrates at (a) a normal DFA graph showing (i) forward transitions, e.g. between state 0 and state 1 and from state 1 to state 2 etc, in each instance from a first state to a second state which cannot be reached earlier than the first state; (ii) reverse transitions such as from state 2 to state 1 and from state 1 back into state 1, in each instance from a first state to a state which can be reached earlier, 'default' transitions, shown dotted, between each of the states, apart from the initial state, back to the initial state.

FIG. 9 illustrates at (b) one simple example of a 'header matching' DFA. As can be seen there are several differences in the Header match DFA compared with the 'normal' DFA. First there is always a forward transition to another state regardless of the incoming value. There is no occurrence of a transition from a given state back into that state, as exemplified for the states 1 and 3 in FIG. 9(a). Furthermore there is a 'No match' state that is entered once the DFA fails to find a matching character (e.g. byte) in a certain position.

It can be seen that for every character position in a header there will have to be at least one state in the DFA. This ensures that the DFA is in effect 'counting' the characters as they come in and that the DFA is checking for position as well as value. This will require the use of an 'any' transition which is taken regardless of the value of the incoming character—this caters for the values that are 'don't care' in the rules. In general this will frequently be used, as will be exemplified later. Transitions based on 'any' will simply be represented in the DFA table as a default transition to the next state. This would mean that there would be no need to use any entries in the 'next and check' table in the case of a two table DFA implementation as described later. The default transition in the 'default and base' table may be set to the next state and then the absence of entries in the 'next and check' table forces the default transition to be taken.

The DFA would start up and progress through the incoming characters one at a time as normal. There would however be no default back to the initial state. If at some point there is no match to the pattern the operation of the header DFA is finished and this finish could be signified by have an Action that is 'No Match'—the DFA would stay in that state once it reaches it, and until it is re-initialised as described later. In other words there would be from every state that has a transition other than 'any' an 'else' condition that would take the machine to the 'no match' state.

Exemplary Embodiments

Figure 10:
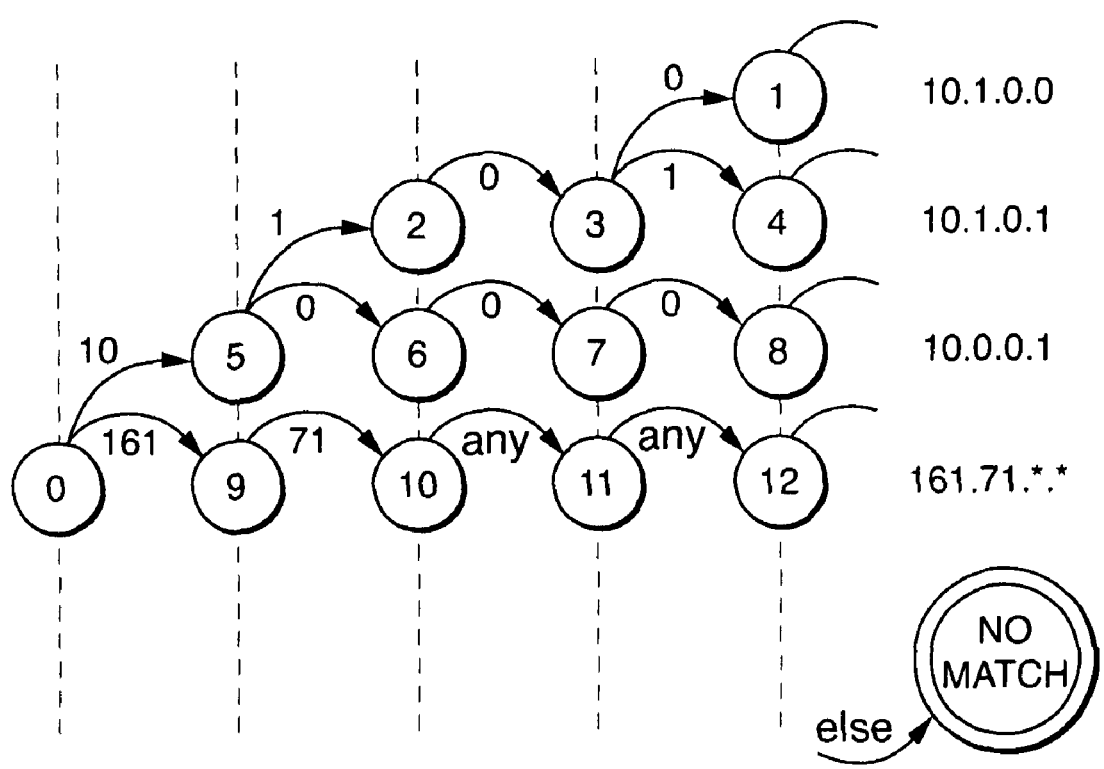
FIGS. 10-14 illustrate embodiments of the invention in a simplified manner.

FIG. 10 illustrates one example of a DFA in accordance with the invention. It illustrates a simple case of a DFA configured to perform matching against any of four four-character IP addresses 10.1.0.0, 10.1.0.1, 10.0.0.1 and 161.71.*.*, where * represents any value of the respective character. For any state there are only a 'forward' transition (or several such forward transitions) and an 'else' transition (shown just once for simplicity). The 'any' transition is used where only a partial match of the first two bytes of the IP address is required, in particular for the IP address 161.71.*.*.

Thus on examination of the first character when the machine is in state 0 will cause transition to state 5 if the first character is '10' and to state 9 if the first character is 161. If the first character is any other value there is a transition to the 'no match' state. Similarly, when the machine is in state 5, the machine will transition to the state 2 if the second character is '1' and to the state 6 is the second character is '0'. Otherwise the machine will transition to the 'no match' state. Note that there is no transition from state 5 to state 0 or to itself.

FIG. 10 omits for convenience the 'else' transitions that will be provided for all the states except states 10 and 11, which have 'any' value causing transition to states 11 and 12 respectively.

Figure 11:
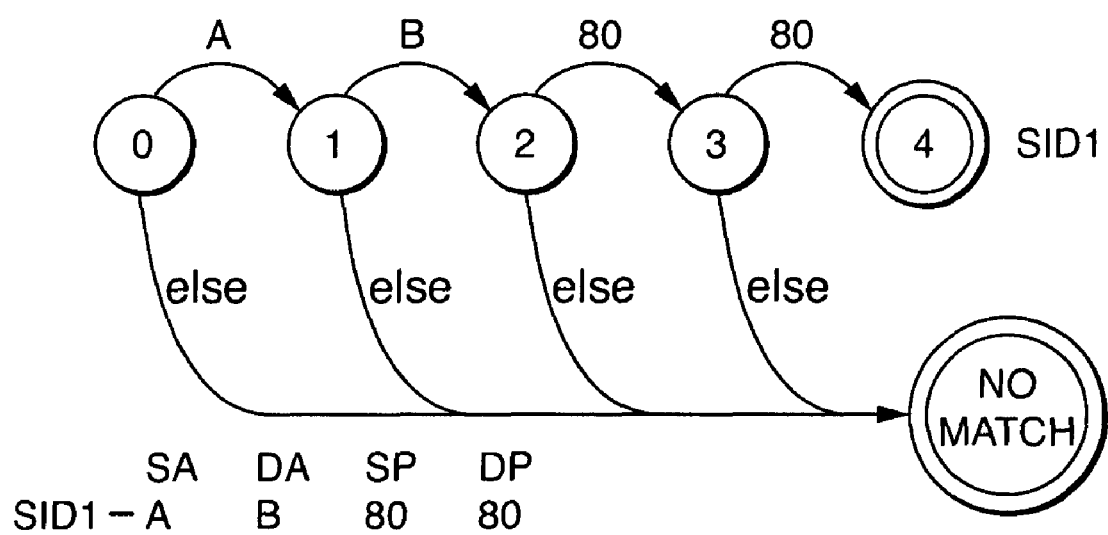
Figure 12:
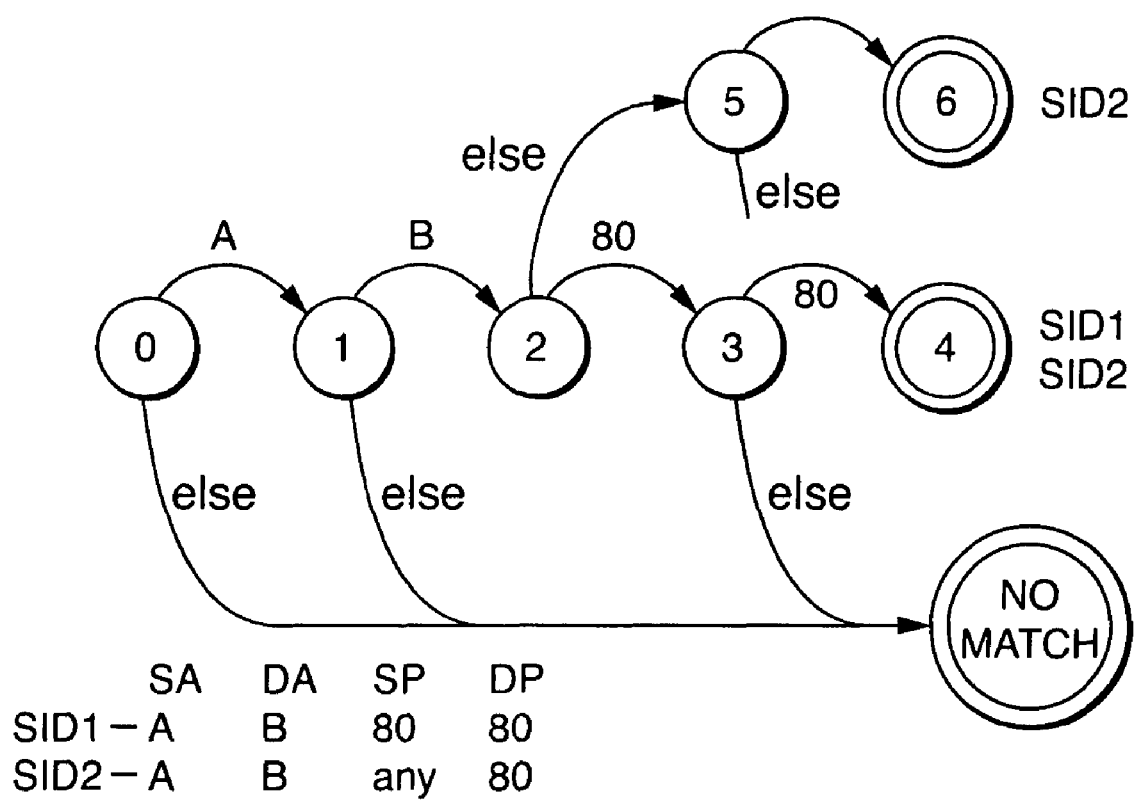
Figure 13:
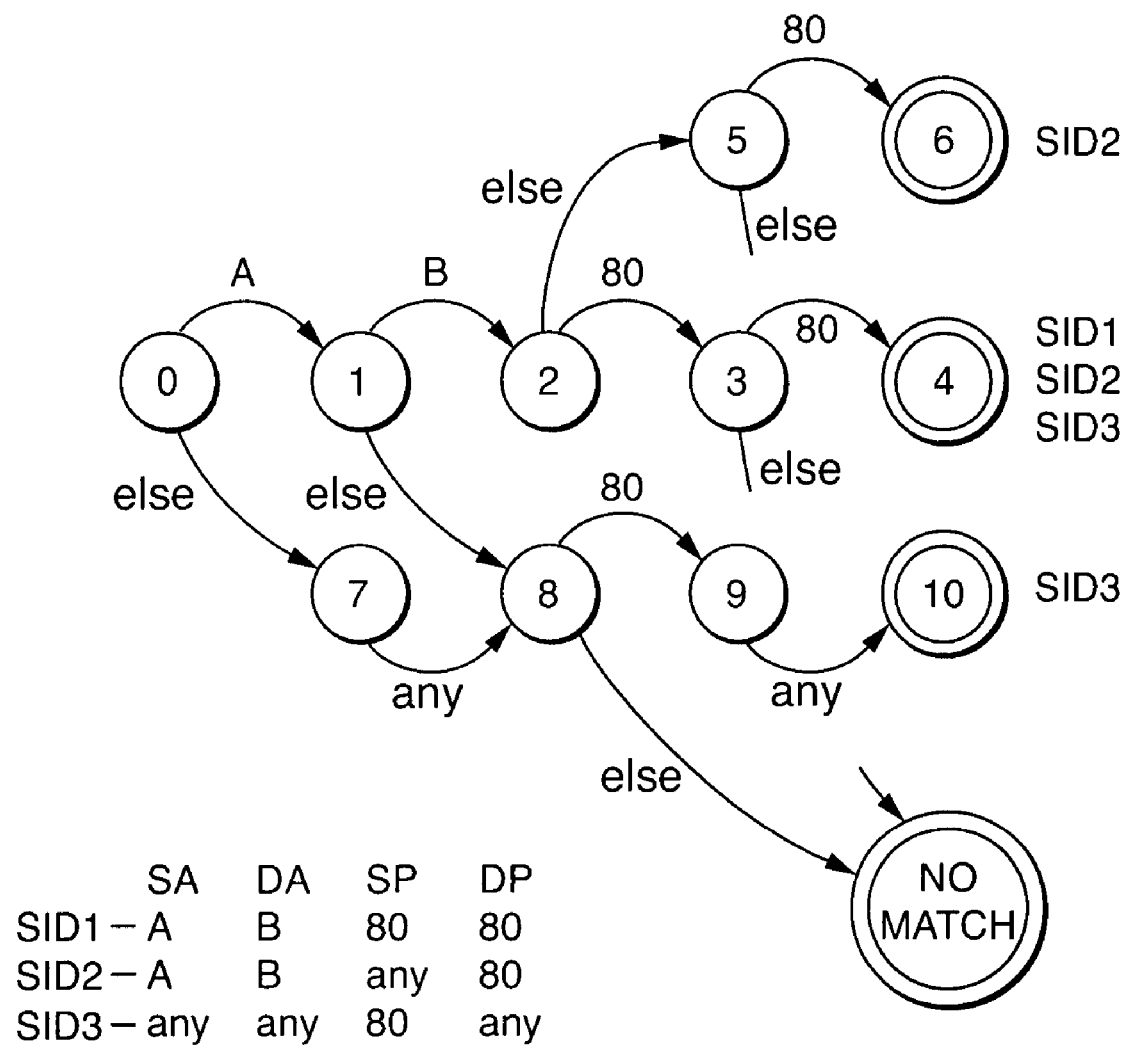

FIGS. 11 to 13 illustrate the construction of a slightly more complex set of 'Snort' IDs (SIDs). The respective DFAs are also illustrated at a more macro level whereby an IP address is represented by a single transition between states where in reality it would actually require four transitions, one for each byte, as in FIG. 10.

The three Snort IDs headers that are to be detected by the DFA are:

|  | SA | DA | SP | DP |
| --- | --- | --- | --- | --- |
| SID1 | A | B | 80 | 80 |
| SID2 | A | B | any | 80 |
| SID3 | any | any | 80 | any | where SA is the source address, DA is the destination address, SP is the 'source port' and DP is the 'destination port'.

The DFA for these SIDs can be constructed by adding each SID to the DFA, one at a time. FIG. 11 illustrates the DFA after the first SID is implemented. This DFA simply exits with a 'No Match' if the header does not precisely match DA=A, SA=B, SP=80, DP=80.

FIG. 12 illustrates the DFA once SID 2 is added. Since SID 2 has the same SA and DA requirements as SID 1 no additional states are required for the address checking part of the DFA. The application port checking however does have different requirements and in particular has a 'don't-care' condition on the SP of SID2. A branch is therefore added at this point in the DFA and the occurrence of 'any' SP followed by a DP=80 leads to a match on SID2. Note however that a header that would trigger SID 1 also matches the requirements of SID 2. The match state 4 is therefore also modified to indicate a match to SID 1 and SID 2.

FIG. 13 illustrates the DFA once SID 3 is added. In this case the SA and DA are don't-cares so new states have to be added for these. As with SID 2 above the condition for SID 1 also meets the conditions for SID 3 therefore the match state 4 has to be further modified to indicate a match to SID 1, SID 2 and SID 3.

Figure 14:
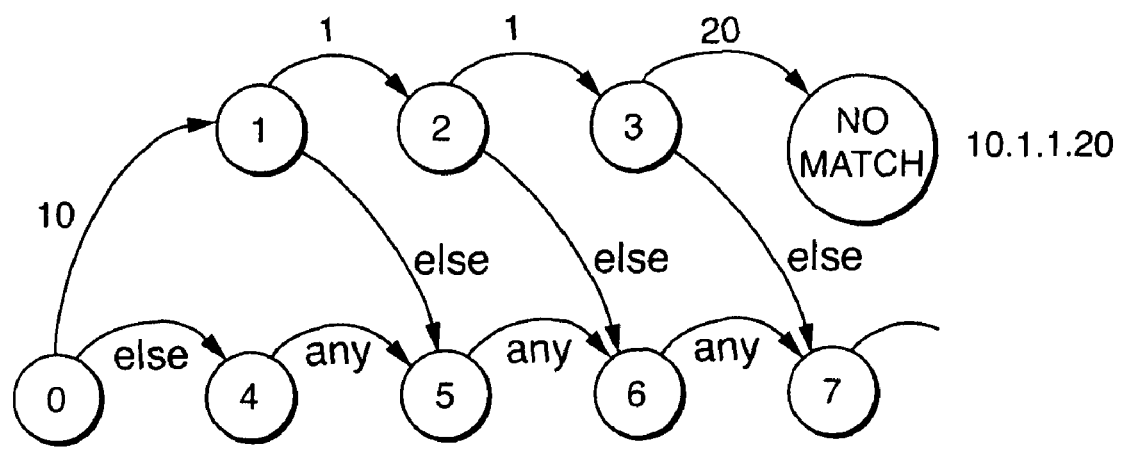

In some cases it may be necessary to exclude all packets with certain header contents from the remaining header checking as well as pattern matching. An example could be all traffic from a known trusted IP address on the network. Taking this as the example, FIG. 14 shows the DFA graph for excluding the IP address 10.1.1.20 from all remaining header and pattern matching while allowing any other IP address to continue. In particular, from each of the states 0, 1, 2 and 3 leading to the 'no match' state for the IP address 10.1.1.20 there is a forward 'else' transition to a state for the next character position.

Those familiar with dual-table implementation of a DFA will apprehend that although it might appear that for each state (assuming 256 possible values per character) there would be 255 paths to the 'next' state and only one to a default state, whereby to consume 255 entries in a 'next & check' table, space may be saved by reversing the significance of the ordinary 'next' and 'default' states.

Figure 15:
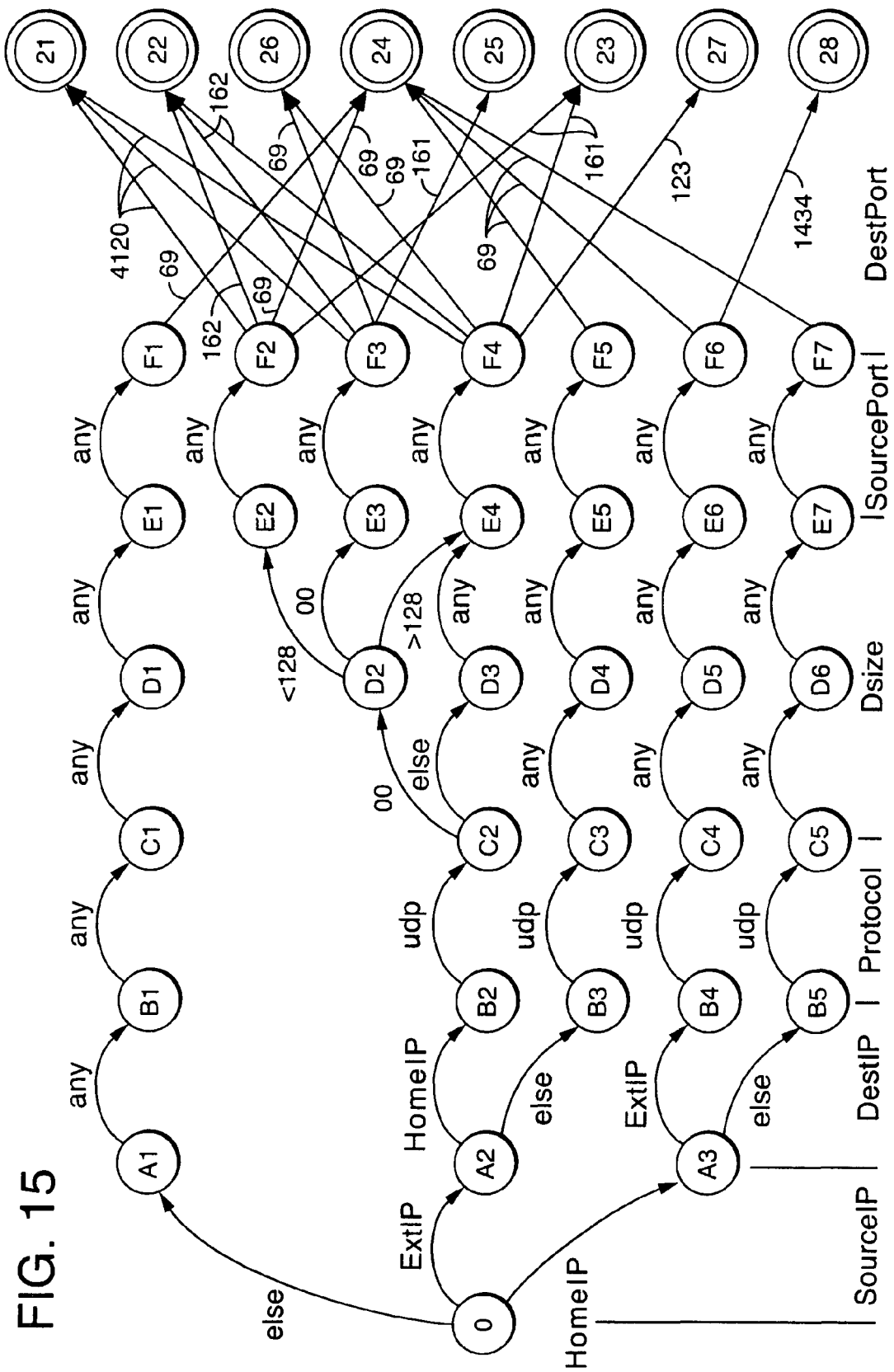
FIG. 15 is a more complex DFA graph illustrating one embodiment of the invention

FIG. 15 is a DFA graph for a header DFA which performs the header matching for a multiplicity of rules which require matching both of content and header patterns.

The graph indicates that the fields of the header of a packet will be examined in turn, the fields being (in this example) the IP source address, the IP destination address, the transmission protocol, the data size of the payload, the 'source port' (the number defining the source application) and the 'destination port' (the number defining the destination application). Each of these field comprise a plurality of characters, but for ease of representation each field has be telescoped into a single step as in the example of FIG. 13. Thus from the default state 0 there will be as many transitions as there are characters in the source address required to reach any of the three states A1, A2 and A3 shown at the boundary between the 'sourceIP and the DestIP parts of the graph. The state reached at the end of the destination IP field will be any one of the states B1 to B5, the state reached at the end of the 'protocol' field will be any one of the states C1 to C5, the state reached at the end of the 'data size' field will be any one of the states D1 to D6, the state reached at the end of the 'source port' field will be any one of the states F7 and in this example the state reached at the end of the 'destination port field' will be any of the final states 21 to 28. However, the operation of the may be terminated by the machine reaching the no match state. In particular, all the rules discussed below are relevant only to 'udp' packets. Accordingly all the states B1 to B5 may have 'else' transitions to a 'no match' state, as described with reference to FIGS. 12 and 13 but omitted for simplicity from FIG. 15.

The particular examples of the rules are shown in Table 3 below.

TABLE 3

| Rule # | Header match | Content match |
|---|---|---|
| Rule 1: | alert udp $EXTERNAL_NET any → $HOME_NET 161:162 | content "BXC") |
| Rule 2: | alert udp $EXTERNAL_NET any → $HOME_NET 161 | |
| Rule 3: | alert udp $EXTERNAL_NET any → $HOME_NET 161 | (dsize; 0) |
| Rule 4: | alert udp $EXTERNAL_NET any → $HOME_NET 4120 | (content; "D"; offset; 0, depth 2;) |
| Rule 5: | alert udp $EXTERNAL_NET any → $HOME_NET 69 | (content "EE" offset; 2;) |
| Rule 6: | alert udp any → $HOME_NET 69 | (content "DC"; offset: 0; depth: 2 content; "EF.GH"; offset: 2 no case) |
| Rule 7: | alert udp $HOME_NET any → $EXTERNAL_NET 1434 | (content: "A"; depth: 1; content "IJKC";) |
| Rule 8: | alert udp $EXTERNAL_NET any → $HOME_NET 123 | (dsize: >128;) |
| Rule 9 | alert udp $EXTERNAL_NET any → $HOME_NET 161 | (content: "D"; offset: 0; depth: 2; URL content: "ABCD"; consent: "DC" content "A"; offset: 17) |

Explanation of the Rules in Table 3

1. Some of the Rules in the table require a particular 'content', occurring in the payload, in combination with a particular header pattern (which includes 'don't care' for some of the header fields). These are Rules 1, 4, 5, 6 7 and 9. The content part of these rules is not examined by the header DFA. In these cases the header DFA assists the elimination of the false positives that would arise if those patterns occurred in packets not conforming to the relevant header rule. In the other rules, Rules 2, 3 and 8, all the relevant required matches relate to the header alone.

2. As described previously in relation to FIGS. 11 to 13, complexity arises if some rules prescribe a particular value for a header field and some do not. For example, Rule 6 applies irrespective of the source IP and destination IP fields. However, there have to be a specific transition from state 0 to state A2 for a specific value of the source IP, as in rules 1-5, 8 and 9 and a transition to state A3 for a different specific value of the source IP, as in rule 7. The effect is that there may be a multiplicity of paths through the graph to a given final state. A similar complexity arises because some rules, viz. Rules 3 and 8, specify limits on the data size, whereas for other Rules the respective criterion is 'don't care'. Thus Rule 6, which prescribes a udp packet having a destination port value of '69' but otherwise is 'don't care' has a match state 24 which can be reached in a multiplicity of ways depending on (for example) the particular source IP address and the data size even though these values are 'don't care' in that Rule.

3. Since different Rules may specify (for example) the same destination port but may specify different values for earlier fields, such as Rules 2 and 3, or different content rules (such as Rules 1 and 9), there is not in general a one-to one correspondence between a Rule and the match states 21 to 28.

4. Match state 21 is reached in conformity with Rule 4 from any of states F2 to F4. Match state 22 is reached in conformity with Rule 1 from any of states F2 to F4: Match state 26 is reached in conformity with either Rule 5 or Rule 6. Match state 24 is reached only in conformity with Rule 6. Which of the states 23 or 24 is reached according to Rule 6 depends on whether the transition from state A2 is to state B2 or state B3. Match state 25 may be reached in conformity with any of Rules 1, 2, 3 or 9. Match state 23 may be reached in conformity with any of Rules 1, 2 and 9. Match state 27 may be reached only in conformity with Rule 8 and is a final match state. Match state 28 may be reached only in conformity with Rule 7 (though then the content specified for Rule 7 then has to be found).

5. All the match states 21 to 28 with the exception of state 27 may be followed by post-match examination to determine conformity with a Rule associated with that state. No such examination is required for state 27, since Rule 8 specifies only header patterns and the header pattern taken to reach state 27 is not part of another rule that includes content matching. Examination will be required subsequent to states 21, 22 26, 24 and 28, since the relevant rule includes content rules, and may be required subsequent to states 25 and 23 since some but not all the relevant rules specify header content. Content rule checking will always be required after 25 & 23 because the headers that lead to these states, combined with certain patterns if found, will match certain rules. What however is different for states 25 & 23 is that reaching state 25 means that Rule 2 and Rule 3 have been matched and reaching 23 means that Rule 2 has been matched. This is why 23 and 25 are considered 'Match and Rule' states.

Implementing a DFA in a Finite State Machine

Figure 16:
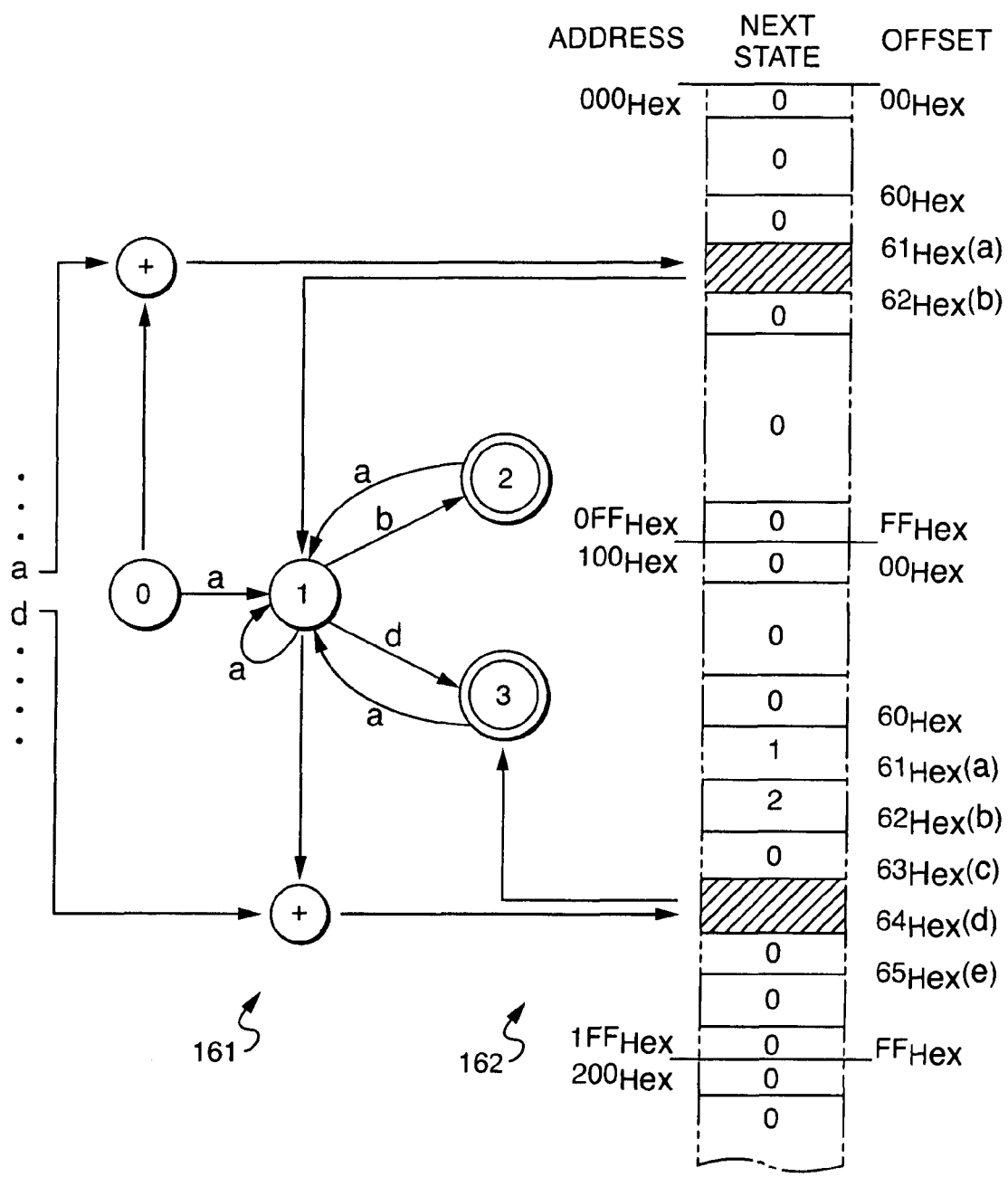
FIGS. 16-18 illustrate various ways in which a DFA may be organised.

In its simplest form the FSM implementation of the DFA, assuming an 8-bit character set, can consist of a 256 entries in memory for each state. The algorithm used is that the value of incoming character is added to current state value multiplied by 0x100. This value will then point to an entry in the table that will provide the next state value. FIG. 16 illustrates for convenience a simple (ordinary) DFA 161 for the character strings 'abs' and 'ad'. State 0 is the initial state and states 2 and 3 are match states for the two character strings. The memory locations 162 are shown to the right and are annotated with address and offset and the pointer value (to the next state) which is respectively stored.

The DFA starts up in its initial state, state 0. This state, multiplied by 0x100, is added to the incoming character value, in this example lower case 'a', the hex value 0x061. This operation is schematically represented by the + symbol. The resultant value is used to index into the 'table' 162 and this returns the next state value, in this case state 1. The DFA is then in state 1 and when the next character, a lower case 'd', is input, this state 1 is multiplied by 0x100 and added to the incoming character value 0x064 to yield 0x164 where the next state value of state 3 is found, and so on.

Speed Versus Memory Usage for Table Per State FSM Implementation

The table per state FSM implementation provides the highest speed implementation of a DFA, requiring only a single memory access for each character received. The price paid for this speed however is the amount of memory it needs. For the example in FIG. 16, four states will require 256×4=1024 entries whereas there are only six transitions that are non default, i.e. not to state zero. In the case of a header DFA where there are only forward transitions, there would be only three transitions that are not to a 'no match' state.

Linked List FSM Implementation

Figure 17:
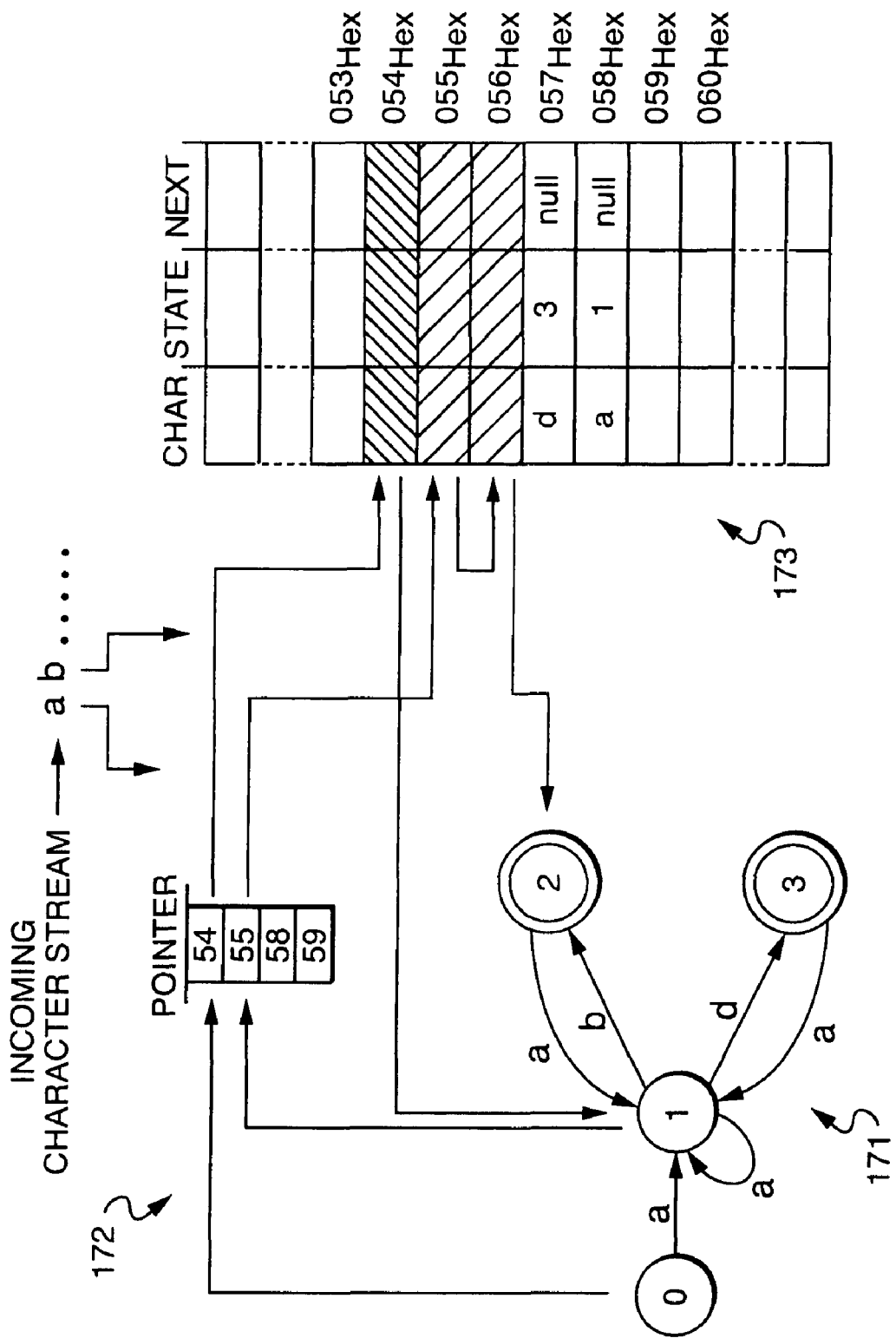

FIG. 17 illustrates the same simple DFA 171 as in FIG. 16, and schematically is shown in a linked list implementation. A pointer for each state locates the start of the linked list in memory. In response to incoming character in the stream a, b . . . the pointer is used to access the first value in the linked list, If the character found in that entry matches the incoming character the state transitions to the state found in that entry. If the character does not match the incoming character the next pointer is examined and if it is null the end of the list is found and a default transition has to e made. The default state can either be recorded in the linked list pointer area or as the state entry associated with the null pointer.

More particularly there is a list 172 of pointers 54, 55, 56 etc, one for each state. These pointers contain the address in memory of the start the of the respective location ($053_{Hex}$, $054_{Hex}$ etc) in the memory 173 storing the respective character, a state and a 'next' state.

Thus when the machine is in state 0 and the first character a in the incoming character stream is received, pointer 54 accesses location $053_{Hex}$. The stored character a has to be compared with the incoming character (also in this case a) and is a match so machine transitions to state 1. In state 1 the pointer 55 accesses location $055_{Hex}$. The next incoming character is 'b' which does not match the character 'a' in this location. The next pointer 56 in examined; this yields character b which matches the incoming character and so on.

The linked list approach provides, as is typical for linked list searching engines, the most efficient use of memory at the cost of slow speed. A state that has many transitions out of it may take many searches before the transition for the current incoming character is found.

Other schemes such as balanced binary trees and hashing could also possibly be used but need not be described in detail.

Dual Table FSM Implementation

In this FSM implementation of a DFA two tables are provided in memory, a 'Default and Base' table and a 'Next and Check' table. The first table, the 'default and base' table, provides two vales, a 'default' state to transition to and a 'base' pointer. The 'base' pointer is offset by the value of the incoming character to access a particular entry in the 'next and check' table. The second table, the 'next and check' table, also contains two values, a 'next' state to transition to and a 'check' state value that is compared against the current state value.

The usual algorithm used is that on input of a new character the 'default and base' value is read and the 'default' value stored. The incoming character is then used to offset the 'Base' value to read an entry from the 'Next and Check' table. The 'Check' value is then compared with the current state. If the check value and the current state match, the DFA executes the transition to the specified 'Next' state; if they do not match the DFA transitions to the 'default' state stored from the reading of the 'Default and Base' table.

The size of the 'Default and base' table has to be equal to the number of states in the DFA. The size of the 'Next and Check' table is dependent on the number of transitions. If there is a small number of transitions out of each state the 'Next and Check' table will be quite small. The worst case occurs if every state in the DFA has a different transition out for every possible character, when the 'Next and Check' table could grow to be as large as the simple transition table approach, but this is unlikely for a header DFA.

Figure 18:
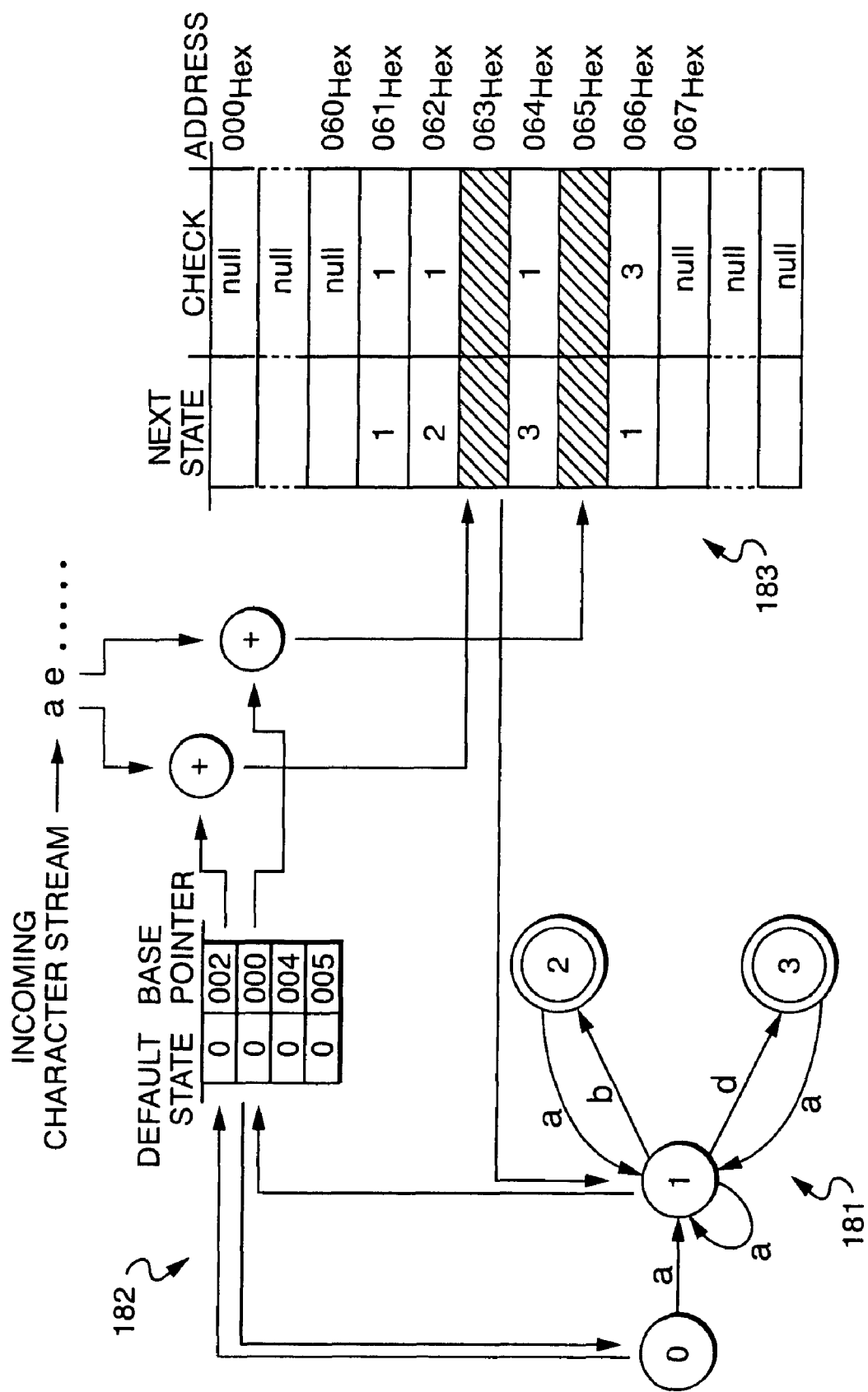

FIG. 18 illustrates the operation of a simple DFA 181, but implemented using two tables, a default and base table 182 and a 'next and check table 183. The table 182 has, as described above, an entry for each state in the DFA. In this case therefore there are four entries. Each (in this case) has a stored default value of 0, indicating that the default state is state 0, and a pointer, denoted 002, 000, 004 etc. The actual values of these pointer are 0x002, 0x000 etc in Hex terms. The + symbol denotes the addition of a pointer value from the table 182 to the Hex value of the incoming character, as before.

Initially, the DFA starts up in its initial state, state 0. The first incoming character is a lower case 'a', which has the Hex value 0x061. On receiving this character the 'default and base' table entry for state 0 is read and the base pointer value, in this case 0x002, is added to the value (0x061) of the incoming character 0x061 to yield the value 0x063. The 'next and check' table entry at offset 0x063 (i.e. $063_{Hex}$) is then read and the check value, in this case state 0, is compared against the current state also state 0. Since these vales are equal the DFA moves to the state recorded as the associated 'next' value in the 'next and check' table. This is state 1.

The DFA is now in state 1 and the incoming character is a lower case 'e', the Hex value of which is 0x065. On receiving this character the 'default and base' table entry for state 1 (the second from the top) is now read and the base value, in this case 0x000, is added to the value if the incoming character 0x065 to yield the value 0x065. The 'next and check' table entry at offset 0x065 is then read and the check value, in this case state 2, is compared against the current state, state 1. Since these values are different, the entry accessed actually relates to state 2, the 'next state' value is ignored and instead the default state value (0) read during the access to the 'default and base' table is used, so that the DFA returns to state 0.

The dual table FSM implementation normally provides the best balance between the speed of the table per state implementation and memory utilisation of the linked list implementation. A fixed, therefore deterministic, two memory accesses are required per incoming character.

It will be understood that a multiplicity of DFAs can be implemented within the same memory; they will be associated with different offsets so that the incoming characters are indexed to a respective block of memory. Also, different types of DFA, header, content and Rules, can also all be implemented in the same memory and same DFA state machine since the type of DFA is determined by its organization. I.e. programming and not the basic structure.

Match and Final State Detection

The DFAs described with reference to FIGS. 16 to 18 are ordinary DFAs with reverse and default transitions. As previously mentioned, a DFA according to the invention differs from ordinary DFAs. It has states which may be termed 'normal', which denotes a state from which there are merely transitions (in this case forward transitions). These are the states A1, B1, C1 . . . F7 as shown in FIG. 15. It will also have, in common with other DFAs, one or more 'match' states, each of which indicates that where the DFA has found a pattern match. Examples of these are 22 and 23 in FIG. 15. In additional the header DFA graph may have a 'no match' state, indicating that absence of match and preferably indicating that the DFA may stop. Examples are shown in FIGS. 12, 13 and 14 but omitted for convenience from FIG. 15. Also, a header DFA graph may have a 'match and final' state which indicates not only a match but the end of the graph. One example is state 27 in FIG. 15, where the matching rule is fully satisfied by a particular header pattern irrespective of the packet's payload. It is a match state because a rule is fully satisfied, it is a final state because the header that lead to this state is not part of any rule that specifies any particular content.

Accordingly when a 'match' state is reached it needs to be recorded and when a 'no match' or a 'match and final' state is reached the DFA preferably needs to be halted.

There are two techniques that could be used to mark 'match' and 'final' states. One would simply be to expand the fields within either the 'default and base' table or the of 'next and check' tables in memory so that states that are match or final states can be marked using for example a single bit flag field, which is read during the access of the table. If at any point the bit is found to be set the appropriate action can be taken.

An alternative, which would avoid having to add bits to memory, is to allocate the state number, which has a one-to-one mapping to the memory address in the 'Default and Base' entry, based on the type of state, either 'normal', 'match', 'final' or 'match and final'. The actual 'state numbers'allocated to each state in a DFA graph is arbitrary. For example, all the DFAs described here have a default or initial state denote with the state number '0'. However, any other number (within the numerical range of the memory) could be used provided that the respective tables (such as table use that number to indicate the default state.

Figure 19:
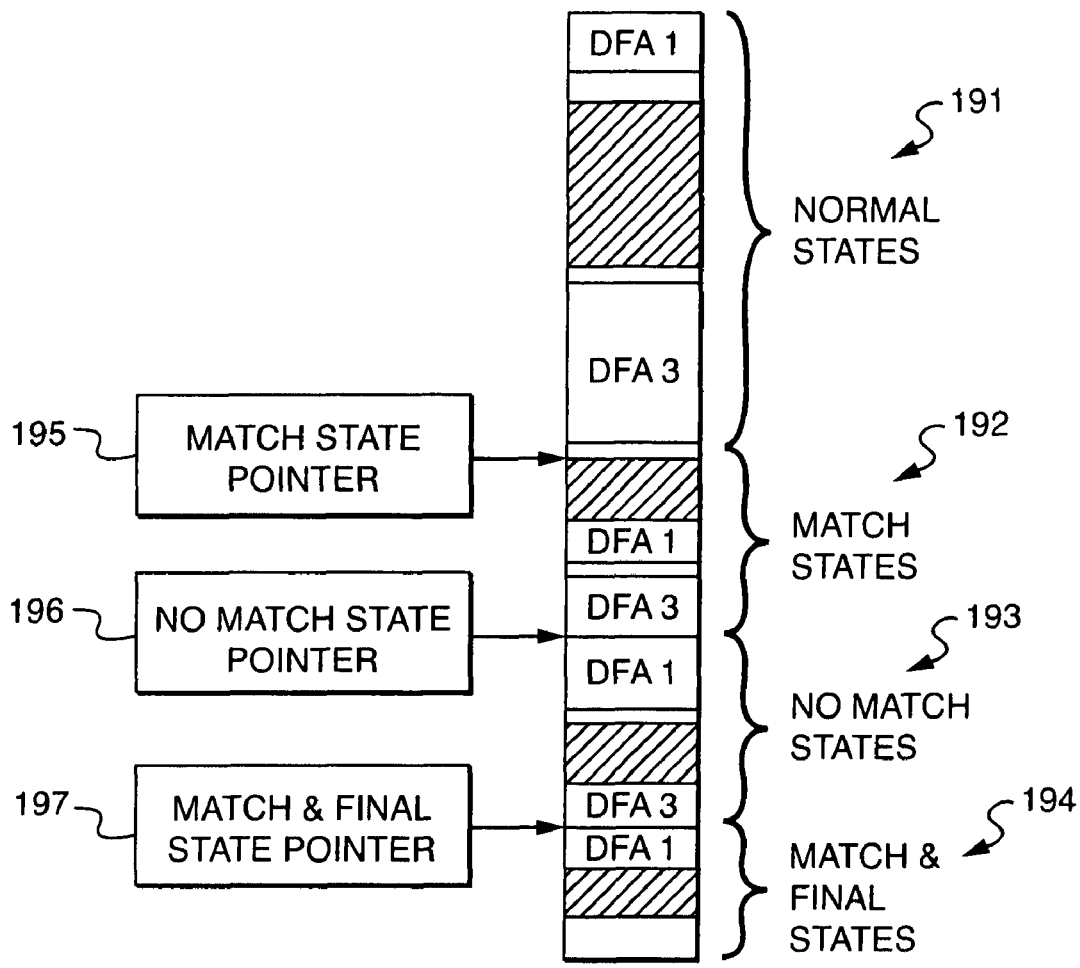
FIG. 19 illustrates the organisation of a memory

DFAs are normally organised with the aid of a compiler. Accordingly it is feasible to allocate the state numbers such that all 'normal' states are in one contiguous block, all states that are 'match' states are in another contiguous block, all states that are 'final' states are in another contiguous block and finally all states that are 'match and final' states are in another contiguous block. This is illustrated in FIG. 19, which shows all the 'normal' states (for three DFAs DFA1, DFA 2 and DFA 3) in a contiguous block 191, the match states for all three DFAs in another block 192, the 'no match' states in block 193 and the 'final and match' states in block 194. In the example there are no 'no match' states for DFA1 and no 'match and final' states for DFA 3.

The machine also needs a set of pointers to delineate the memory into the blocks that contain the respective types of states. Then by means of comparators compare the state, which is simply the memory address being accessed, against the pointers. If for example the address accessed is within the range of the Match state block 192 that state is a Match state. It is not actually necessary to have a start and end pointer for each block. In the example of FIG. 19, there are only three pointers, a 'match state' pointer 195 which defines the end of the 'normal' state block 191 and the start of the 'match' state block 192, a 'no match' state pointer 196 which defines the end of the 'match' state block 192 and the start of the 'no match' state block 193 and a 'match & final' pointer 197 which defines the end of the 'no match' block 193 and the start of the 'final & match' block 194.

While there may be multiple DFA graphs stored within the memory, it is not necessary to have a respective set of pointers for each DFA graph. All that is necessary is that the compiler places each set of states types for each DFA, for example all 'match' states, within the area of memory configured for that state type. All that is required for DFA context is which DFA graph is being run. If a stream is being examined by a particular DFA graph, then the only states that DFA graph can reach are further states within the same graph. Multiple DFAs can therefore exist in the same memory. Unused memory can also exist, interspersed with, or at the end of, a particular state types block of memory. Since these states have no transitions to them they never can be reached.

While FIG. 19 illustrates each DFA graph being in a contiguous block of memory for convenience, even this is not necessary as a DFA graph will only ever traverse the states within that graph and the actual state numbers chosen are arbitrary. All that is required is that states are within the correct state type memory range, for example all match states must be within the defined range for 'match' states.

State Machine Implementation in Hardware

Figure 20:
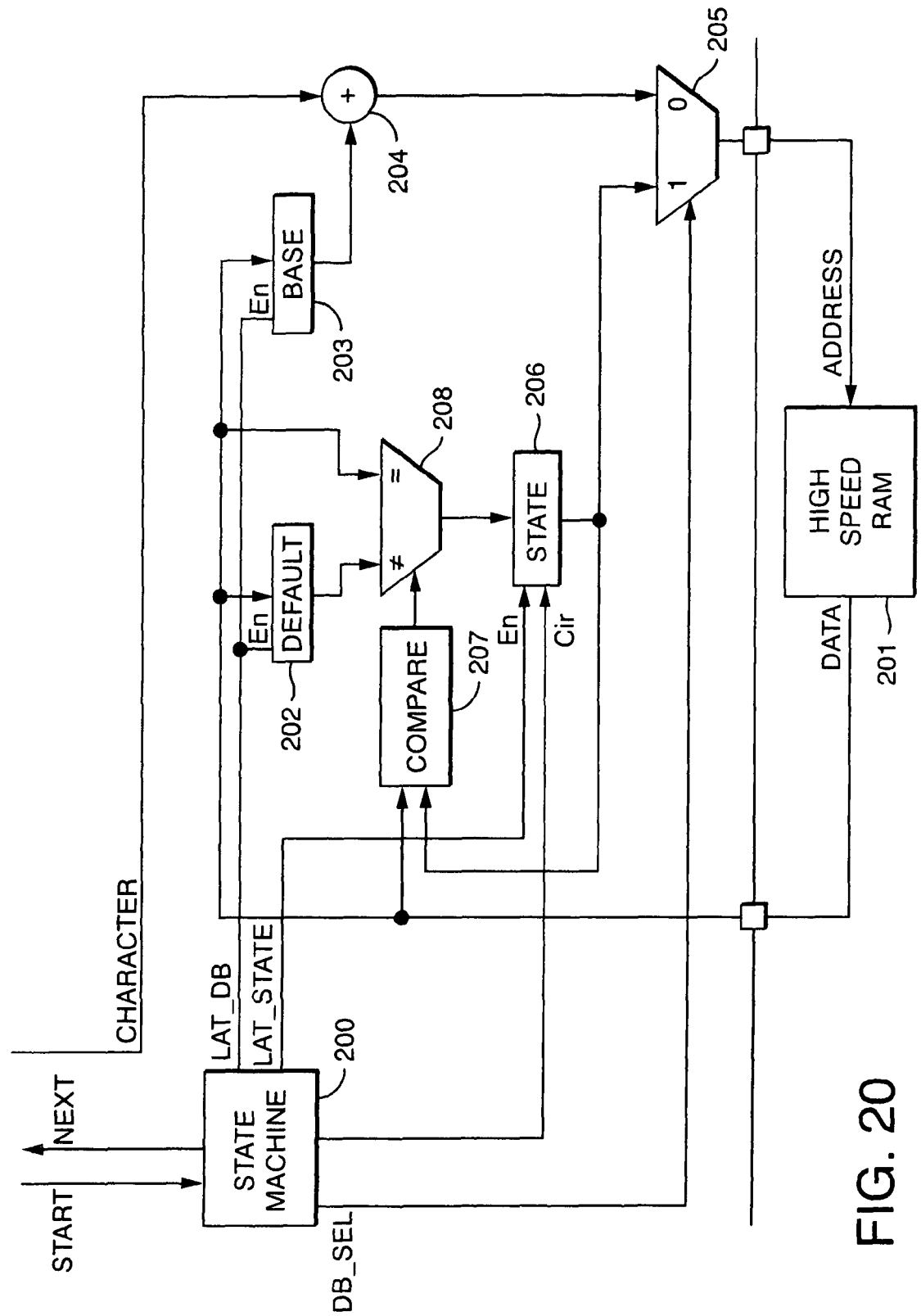
FIG. 20 illustrates a specific manner of implementation of a DFA in accordance with the invention.

FIG. 20 illustrates one example of a hardware implementation 200 of a Dual Table FSM suitable for an embodiment of the invention.

FIG. 20 includes a high-speed random-access memory (RAM) 201 which has address lines ADDRESS (shown as a single line, like all the other lines, for convenience) for an address value selected by a multiplexer 205. If a select signal DB_SEL from a controller 200, is 'clear', the multiplexer 205 selects an address value obtained by combining (as shown by the adder function 204) the incoming character (appearing on line CHARCATER) with the base offset provided by a base register 203. If the select signal DB_SEL is set, the multiplexer 205 selects the content of a state register 206. Also shown in FIG. 20, and operational as described below, are a default register 202, a comparator 207 and a multiplexer 208.

On start-up the START signal to the controller 200 will initialise, by way of the 'clear signal 'clr' the state register 206 to its initial state, state 0 as shown in the various graphs, and select the address to be presented to the (external) RAM 201 to be from the state register by setting the DB_SEL signal true. This in turn will address the 'default and base' entry for state 0 in the RAM 201 which will be presented on the RAM's data bus DATA after the access time of the RAM 201.

The incoming 'default and base' values will be stored in the respective default and base registers by the use of the LAT_DB signal of the state machine. Once these are stored the controller 200 will negate the DB_SEL signal, causing the address that is presented to the RAM 201 to be the value in the base register 203 plus the value of the incoming character. This value will address a 'next and check' entry in the RAM 201, and this entry will be presented on the RAM data bus DATA after the access time of the RAM.

From the incoming 'next and check' value the state check value will be compared against the current state value by comparator 207. If this comparison reports a match this means that the 'next and check' value access is valid for that state and character combination and is therefore a valid transition. The value of the 'next' state from the incoming 'next and check' value will therefore be loaded into the state register 206 through the use of the multiplexer 208.

If alternatively the comparison reports a mismatch between the state register value and the check state from incoming 'next and check' value a valid transition has not been found and through the multiplexer 208 the default state value stored on the previous RAM access is used to load the state register. There will now be a new state in the state register and a new character is accessed by the state machine while the whole process is repeated.

High Speed SRAM

In a specific example there are two blocks of SRAM, one being used for default state and base pointer values, the other for next and check state values. The following mappings are defined for 32 bit wide SRAM. This will yield a maximum DFA graph size of 65,536 states. A larger SRAM can be used if a greater number of states is required or necessary.

Default State and Base SRAM Contents

| Name | Bit number | Description |
| --- | --- | --- |
| Base pointer | 31:16 | This value is multiplied by base pointer multiplier and the result added to the incoming character value and the result is used to access the Next and check high speed memory. |
| Default state | 15:0 | The value is used as the next state if the check state value accessed using the base pointer and incoming character is not the same as the current state. |

Next and Check State SRAM Contents

| Name | Bit number | Description |
| --- | --- | --- |
| Check state | 31:16 | If this value is equal to the current state the value in the Next state field is loaded as the next state, if not the value in the Default state field is loaded as the next state. |
| Next state | 15:0 | This value is used as the next state if the current state is equal to the check state. |

Base Pointer Multiplier Register

| Name | Bit number | Description |
| --- | --- | --- |
| Reserved | 31:2 | Reserved |
| Base pointer multiplier | 1:0 | This value allows the base pointer to be multiplied by 0, 2, 4 or 8 allowing the ratio of Default and base memory to Next and check memory to be varied. |

Match State Base Register

| Name | Bit number | Description |
| --- | --- | --- |
| Match base | 31:0 | Access to a state in the 'Default and Base' high speed SRAM equal to, or greater than this base address, but less than the No Match base address, indicates that the DFA that the DFA has reached a match state. |

'No Match' State Base Register

| Name | Bit number | Description |
| --- | --- | --- |
| No match base | 31:0 | Access to a state in the 'Default and Base' high speed SRAM equal to, or greater than this base address, but less than the Match and Final base address, indicates that the DFA has failed to match anything in the header graph. The DFA state machine will then halt. |

Match and Final Base Register

| Name | Bit number | Description |
| --- | --- | --- |
| Match and final base | 31:0 | Access to a state in the 'Default and Base' high speed SRAM equal to, or greater than this base address indicates that the DFA has found a match in the header graph but this match is also a final state. The DFA state machine will then halt. |

Additional registers may define additional areas of memory for other states.

Result Registers

The results register consists of a set of match states and stream match offsets. In this simple example there are only three. The results register prescribes a limit of matches that may be recorded for any particular stream. Once this limit is reached the DFA may be halted regardless of the point in the stream it has reached.

| Address | Name |
| --- | --- |
| 0 | Match state 0 |
| 1 | Match offset 0 |
| 2 | Match state 1 |
| 3 | Match offset 1 |
| 4 | Match state 2 |
| 5 | Match offset 2 |

Match State Register

| Name | Bit number | Description |
| --- | --- | --- |
| Reserved | 31:16 | Reserved |
| Match state | 15:0 | The state number (the address in the Default and check high speed memory) of the detected Match state. |

Match Offset Register

| Name | Bit number | Description |
| --- | --- | --- |
| Match offset | 31:0 | The offset into the stream where the associated Match state was detected. |

Software

Although the invention is in essence a hardware engine, the organisation of the DFA requires, as is customary, software support. This includes a set of software tools that take a set of regular expressions through the stages of Regular Expression to NFA to DFA and then possibly DFA minimisation. It may be necessary to have a set of pre-processing that can take expressions in some industry standard format, such as SNORT, and convert these to Regular Expressions for DFA generation. Once the DFA is produced the 'default and base' and 'next and check' tables will have to be generated—the 'default and base' table is reasonably simple as this is just a list of states with their default transitions and pointers to their associated 'next and check' tables. The 'next and check' table however is more complex to generate, requiring efficient compacting where spaces in the 'next and check' entries for one state are filled by 'next and check' entries for another state in the most, space efficient way.

A second set of software tools would be a set of drivers for the various applications this hardware assisted DFA engine is going to support. These drivers will replace the normal software driver DFA functions these applications normally utilise.

Summary

The invention has been described specifically in terms of the detection of header matches in addressed data packets. However, it is in principle applicable to the detection of positonally dependent matches in character strings for which a matching rule specifies prescribed values for some (but not necessarily all) of the characters in a string and the respective position in the string wherein each of those values must occur.

The invention claimed is:

1. A deterministic finite state machine organised for the detection of positionally significant matches of characters in a string of characters, and comprising a multiplicity of states including an initial state, wherein the machine examines each character in turn to determine a exit transition for a current state of the machine to another state and wherein the machine:

responds to an examination of the string of characters by executing in response to a first character at the commencement of the string a transition from the initial state to another state;

has at least one state for every character position;

includes a exit transition from each state for each character to another state; and possesses only forward exit transitions each from any of the states whereby the current state of the machine unambiguously represents a count of the number of characters from the commencement of the string.

2. A deterministic finite state machine according to claim 1 and including at least one match state which indicates that all character matches in the string required by at least one respective rule have been detected.

3. A deterministic finite state machine according to claim 1, wherein some but not all the states in the multiplicity of states each have a single exit transition for any value of a respective character in the string.

4. A deterministic finite state machine according to claim 1, wherein at least some of the states in the multiplicity of states each define an exit transition to a state indicating 'no match'.

5. A deterministic finite state machine according to claim 4 wherein the machine is disposed to cease its examination of the character string on attaining the 'no match' state.

6. A deterministic finite state machine according to claim 1, wherein at least one of the states in the multiplicity of states has a first exit transition to a first different state prescribed for a particular value of a respective character in the string and a second exit transition, to a second different state, prescribed for any value of the character other than the particular value.

7. A deterministic finite state machine according to claim 1 wherein the character string which the machine is organised to examine is the header of an addressed data packet, the header consisting of a succession of fields each consisting of at least one character.

8. A deterministic finite state machine according to claim 7 wherein each character consists of one byte.

9. A deterministic finite state machine according to claim 1 and implemented as a dual table finite state machine.

10. A deterministic finite state machine according to claim 9 and including further states that indicate whether a complete match for the character string has been detected and wherein the states and the further states are represented in a random access memory which is partitioned such that the states in the multiplicity of states and further states are respectively grouped within respective ranges of the memory.

11. A deterministic finite state machine according to claim 10 and including at least one 'no match' state indicating the absence of a match for the character string and wherein the 'no match' state is represented within a respective range of the memory.

* * * * *